United States Patent Office 2,996,411
Patented Aug. 15, 1961

2,996,411
RESIN-IMPREGNATED FILAMENTARY
MATERIAL
Herbert G. Lauterbach, Wilmington, Del., assignor to E. I. du Pont de Nemours and Company, Wilmington, Del., a corporation of Delaware
No Drawing. Original application Aug. 2, 1955, Ser. No. 526,062, now Patent No. 2,875,474, dated Mar. 3, 1959. Divided and this application Feb. 21, 1958, Ser. No. 716,523
4 Claims. (Cl. 117—140)

This invention relates to reinforced plastics concerning especially production of laminates of particular filamentary content.

In the rapidly growing industry based upon shaping of articles composed of fibrous reinforcing agents and resinous impregnating agents, the usual major components are glass fibers and polyester resins. Despite apparent deficiencies in manufacture of the product (usually called a "laminate") traceable to the glass component, replacement of it by other conventional filamentary material has worked no great improvement in construction.

A primary object of the present invention is provision of improved plastic laminates. An object is construction of pliable fiber-reinforced resin-impregnated articles that can be deep-drawn to conform to the contours of intricately shaped molds. Other objects of this invention, together with methods of attaining the various objects, will be apparent from the following description.

In general, the objects of the present invention are accomplished by utilizing as reinforcing agent for an impregnating resin a needle-punched batt consisting essentially of unbonded non-woven synthetic organic filamentary material. The invention contemplates deformation of a resin-impregnated batt so composed to desired shape, in a mold or otherwise, at ordinary or room temperature. Thus, the invention comprehends in particular a process including the steps of placing a pliable non-woven needle-punched batt composed of synthetic organic filamentary material and having its interstices occupied by thermosetting resin in a cold mold and thereby deforming the batt by enforced spatial rearrangement of individual filamentary components rather than by stretching or breakage of the individual components, and heating the mold to a temperature effective to cure the resin.

Natural filamentary materials are not satisfactory in this practice because of their inherent fibrillar non-uniformity, especially in diameter. Inorganic filamentary materials are characterized by excessive brittleness and poor transverse properties: similar inability to deform sufficiently is characteristic of woven materials, as well as of non-woven materials whose filamentary components have been bonded to one another by fusion or otherwise.

According to the present invention, adequate stability in conferred upon the synthetic organic filamentary batt, and structural strength upon the ultimate laminated article, by "needle-punching," which here signifies forceably orientating substantially perpendicular some of the component filaments of a mass of filamentary material characterized otherwise by predominantly coplanar orientation; as suggested by the terminology this may be accomplished conveniently by reciprocating rough needles or the like into and out of the filamentary mass, a step that may be accomplished with a standard needle loom. Further details of preparing this type of batt are contained in the present inventor's following patent applications: Serial No. 312,067, filed September 29, 1952, and Serial No. 489,492, filed February 21, 1955. The batt to be needle-punched may be formed in any of many ways, including carding or garnetting, air-doffing, and jet-deposition, and may be built up by crosser-lapping or the like.

These preliminary steps of batt formation and subsequent steps of impregnating the batt with solidifiable resin and solidifying the resin are well known to those skilled in the art; general laminating technique is applicable here and requires no extensive explanation, although this invention is adaptable to departures from accepted procedure, as mentioned more specifically below.

In the following examples the practice of the present invention is illustrated with batts formed from three denier, three inch staple by carding and crosser-lapping followed by passage four times (from alternate sides, total of two each) through a 36 inch needle loom (James Hunter Machine Company) equipped with about 1400 needles at a feed of about 0.285 inch between needle oscillations; the needles had a "rasping profile" prepared by etching of conventional barbed needles, conforming to those of the first example in the second patent application mentioned above. All parts and percentages are given by weight in the following examples unless otherwise indicated.

EXAMPLE I

A needle-punched batt of 3 inch, 3 denier per filament (d.p.f.) nylon (polyhexamethylene adipamide) staple fibers prepared as described above to a thickness of 0.22 inch and density of 0.50 gram per cc. (as compared with one inch and 0.11 g./cc. before needling) is impregnated with 1½ times its volume of a thermosetting polyester resin ("Selectron" 5003 containing 1% benzoyl peroxide catalyst). A commercial batt (Owens-Corning "Fiberglas") of needled glass fibers (thickness 0.22 inch, density 0.12 g./cc.) is impregnated with the same resin to the same extent as a control. Placed between heated stainless steel plates (8 by 8 inches) each of these is formed into flat bubble-free sheets of ⅛ inch and ¹⁄₁₆ inch thicknesses by suitable shimming and application of pressure (50 to 200 pounds per square inch) using a curing cycle of 80° C. for 30 minutes followed by 115° C. for 15 additional minutes. Comparison of articles so formed in abrasion resistance (mg. loss per 1000 cycles, Taber), light transmission, weathering (weatherometer), and visual surface characteristics reveals for the nylon-reinforced articles about 10 times the abrasion resistance, ⅓ more (total ⅗) transmission of incident light, superior weather resistance, and smoother and more uniform surface free from fibrous characteristics.

Impregnated batts prepared as in the above example were molded into the form of ashtrays one inch deep (as a representative shallow article) and of flower pots four inches deep (as a representative deep-drawn article) using comparable technique. No difficulty was encountered in formation of the ashtrays from either the nylon or the glass batts, although the glass-reinforced ashtrays had an unsightly fibrous surface obviously inferior for such use to the clear surface of the nylon-reinforced trays. In formation of the flower pots, the nylon batt conformed readily at room temperature to the full depth of the mold by rearrangement of the component fibers, while even at ordinary laminating temperatures the glass batt would not conform to the full depth of the mold without breaking.

EXAMPLE II

Fibers of polyethylene terephthalate are assembled into a batt and needled by the method described above; a plain fabric (6 oz. per yard) woven from yarn of 840 denier composed of like fibers (3 inch, 3 d.p.f.) is selected as a control. Both filamentary structures are impregnated and molded into ¼ inch sheets by the method of Example I; the resin permeates the batt thoroughly much more readily than it does the woven yarns. The fiber content (by volume) of the batt-reinforced article is 40%, and of the fabric-reinforced article 44%; the surface of the former is smooth without any sign of fibrous content visible, while the surface of the latter not only follows the contour of the weave but also clearly shows the fabric pattern when viewed by light transmitted through the object.

Attempts to form ashtrays and flower pots from impregnated batts and impregnated woven fabrics like those prepared in Example II showed that, whereas the batts conformed to the respective molds without difficulty, whether hot or cold, the fabrics required considerable manual preshaping before conforming to either mold without wrinkling and assumed the flower pot shape only with comparative difficulty. On the other hand, attempts to make such articles from batts similarly prepared but without the needle-punching produced articles in which the fibers conformed too readily to the desired shape, shifting position so much as to produce separate resin-rich and fiber-rich regions in the product; this phenomenon, which is known as "fiber-washing" is undesirable, one reason being that a resin-rich surface is susceptible to crazing and chipping. Washing is also characteristic of needle-punched batts composed of very short staple fibers (i.e., less than about 1½ inches long); for the purposes of this invention a length of at least 2 inches is desirable for individual filamentary components of the batt.

The above examples recite some of the advantages of using pliable reinforcing batts of two specific compositions of synthetic organic filamentary material as reinforcing agents; many other compositions are similarly suitable, including polyamides generally (e.g., polyhexamethylene sebacamide, polycaproamide, and copolymers of these or other polyamides), polyesters (e.g., polyethylene sebacate), polyesteramides, polyureas, polyurethanes, acrylonitrile polymers (polyacrylonitrile and copolymers of acrylonitrile, especially with other ethylenically unsaturated monomers, such as vinyl chloride, vinyl acetate, methyl acrylate, and vinyl pyridine), vinyl polymers generally (e.g., polyvinyl acetate, polyvinyl chloride, and polystyrene), polymerized hydrocarbons and halogenated derivatives thereof (e.g., polyethylene, polytetrafluoroethylene), synthetic proteinaceous polymers, and cellulosics (e.g., regenerated cellulose and esters, ethers, and similar derivatives). If desired, batts of these or other fibers may be combined in the same article; glass fibers may be included in one or more layers underlying surface layers of synthetic organic filamentary material.

Where the filamentary material used (e.g., fibers of polyethylene terephthalate) has a characteristic of retracting to diminished length (manufacture described by Whinfield and Dickson in Patent 2,465,319) or crimping (manufacture described by Hebeler in Patent 2,604,489), preliminary compaction of the article may be accomplished by suitable treatment (e.g., heating) in presence or absence of the impregnating resin; similarly, regenerated cellulose produced as described by Nicoll in Patent 2,515,834 crimps spontaneously upon treatment with anhydrous ammonia or aqueous alkali. Filamentary materials of many of the compositions listed above and others can be produced with such a property, if desired, in special applications of the practice of this invention; however, use of substantially non-retractable material is generally satisfactory and usually preferred.

The ratio of the breaking strength of the batt to its breaking elongation may be selected as an index of the ability of the resin-impregnated batts of this invention to fill out a deep or intricate mold at moderate pressure and room temperature. When measured as described below, this ratio should not exceed unity: a sample strip measuring 2 inches by 8 inches (with a thickness determined using a 10 ounce load applied to opposite sides over an area of 1 square inch) is clamped with 3 inches of its length extending between the two grips of an "Instron" tensile tester and elongated gradually under tension. Computed, in pounds per square inch, from the breaking load in pounds (taken at the point on the stress-strain curve where rapid decline in strength occurs) and elongation in percent increase in length (at the same point) over the initial length, this ratio is indicated in the following table for a number of samples of indicated composition, along with values of weight and thickness for each.

Table

| Filamentary Material | Wt./Area (Oz./Sq. Yd.) | Thickness (Inches) | Breaking Strength/Elongation |
|---|---|---|---|
| 1. Polyacrylonitrile (3 d.p.f., 3") carded batt punched with barbed needles | 4.7 | 0.095 | 0.32 |
| 2. Same as #1 except punched with etched needles | 7.3 | 0.176 | 0.56 |
| 3. Polyethylene terephthalate (6 d.p.f., 2½") carded batt punched with etched needles | 10.3 | 0.245 | 0.09 |
| 4. Same as #3 except punched 1½ times as much | 10.3 | 0.268 | 0.28 |
| 5. Same as #3 except punched 2½ times as much | 11.6 | 0.262 | 0.85 |
| 6. Needled glass mat | 20.2 | 0.220 | 3.6 |
| 7. Bonded glass mat | 14.2 | 0.064 | 8.5 |
| 8. Bonded rayon web | 2.8 | 0.031 | 32.6 |
| 9. Bonded nylon web | 2.8 | 0.019 | 28.6 |
| 10. Bonded web of acrylonitrile/vinyl chloride copolymer | 2.0 | 0.005 | 19.4 |

The above table shows the distinction in values of strength-to-elongation ratio characteristic of the unbonded non-woven synthetic organic filamentary batts of this invention, on the one hand, and of bonded and brittle filamentary reinforcing agents, on the other. The first five items listed are wholly suitable, and the last five unsuitable for use in deep molds.

Any of many solidifiable resins may be employed in the practice of this invention; of course, their viscosity characteristics should permit ready permeation of the filamentary material. The exemplified polyester resin may be supplanted by polyester resins supplied to the trade as "Vibrin" X1060, 119LS, 1058C, and 151 and "Plaskon" 941 and 961, to name but a few. Other thermosetting resins suitable for this purpose include urea-formaldehyde, melamine-formaldehyde, and phenol-formaldehyde, also alkyd resins and epoxide resins (e.g., "Epon" 834). Thermoplastic resins, which may be used instead, include acrylic resins, polyethylene, polystyrene (e.g., "Styron" 40-K27, clear), polyamides, polyesters, and the like.

The solidifiable resin may be incorporated in the batt in any conventional manner; thermosetting resins are supplied normally in liquid form, and thermoplastic resins may be employed either molten or suitably dissolved or dispersed. The conditions for solidifying the resin-impregnated articles of this invention also will be dependent upon the particular resin used. Thermoplastic resins will solidify upon evaporation or other removal of the solvent or dispersing vehicle or simply by cooling to solidifying temperature. In general, temperature and pressure conditions recommended by the manufacturer for molding with the particular resin should be followed. Of course, the more usual thermosetting resins solidify best at elevated "curing" temperatures, usually at elevated pressure; a resin-polymerizing catalyst may be selected to effect low-temperature curing when it is desired to accomplish both shaping of the resin-impregnated batt and solidification of the final article at room temperature. Attainment of a solid state or "cure" of a thermosetting resin may be accomplished continuously or in two or more separate steps between which the partly cured article may be shaped into ultimate desired form.

Many advantages inherent in practice of the present invention are mentioned above. Other benefits include resistance to staining by food and drink, paintability of the finished laminate, precolorability by dyeing or pigmentation of the component filamentary material or resin, high resistance to splitting into layers, and high impact strength. Although the batts of this invention exhibit acceptable adhesion to impregnating resins for ordinary uses of the finished article, where additional improvement in adhesion is desired it is recommended that the batt be composed of filamentary polyethylene terephthalate treated with aqueous caustic before impregnation; for example, a noticeable improvement in adhesion was obtained with a batt like that of Example II upon immersion of the batt in 10% aqueous solution of sodium hydroxide for 15 minutes at room temperature. The impregnated batts may be molded into sheets, rods, tubes, balls, spheres, hemispheres, and cones, as well as a variety of irregular geometrical shapes. The solidified articles may be formed into V shapes or cylinders, for example, by heating, or through use of solvents for the component filamentary material, followed by bending.

For these and other reasons that will become apparent to those undertaking to practice the present invention, it is useful in the manufacture of (inter alia) such products as automobile and truck bodies and parts, boat hulls, radomes, railroad cars, bodies and parts, printed circuits, machine and electrical appliance housing, refrigerator cabinets, electrical insulation, furniture, decorative sheets and panels, translucent sheets, corrugated sheets, troughs, chutes, trays, conveyor equipment, carts, bins, tanks, pipes, containers, sleeves, ducts, hoods, helmets, radio cabinets, drying trays, serving trays, crystallizing dishes, meat pallets and racks, food molds, conveyor flights, roofing and other structure parts for houses, refrigerator cars, deep freeze cabinets, table and bench tops, chemical apparatus, and structural parts for aircraft.

In addition to the advantages already cited for the particular batts having solidifiable resin occupying the interstices thereof, there are also advantages for the final solidified articles or laminates of this invention. These final articles whether containing thermoplastic resin or thermoset resin have superior resistance to outdoor weathering and water immersion compared to similar articles made with glass or cotton filamentary reinforcing material. This is believed to be due to a combination of reasons. The needle-punched batts of this invention have better adhesion to the resin, they show much less wicking of water in the final laminate form, and their shrinkage properties are more closely matched to those of the resin than when using glass or cotton reinforcement. As a result of these differences, a glass reinforced laminate loses two to three times as much of its initial tensile and impact strengths compared with, for example, the polyester reinforced laminate of this invention described in Example II, when both are subjected to a controlled water immersion resistance test. Also the final laminates of this invention can be further shaped by heating whether they contain thermoplastic or even thermoset resins, which is a surprising advantage not possible with glass laminates.

This application is a division of application Serial No. 526,062, filed August 2, 1955, by Herbert G. Lauterbach, now U.S. Patent No. 2,875,474 dated March 3, 1959.

The claimed invention:

1. Article comprising an unbonded non-woven needle-punched batt consisting essentially of synthetic organic filamentary material and a thermosetting resin occupying the interstices of the batt.

2. Rigid article comprising a resin-impregnated and cured unbonded non-woven needle-punched batt consisting essentially of synthetic organic filamentary material having its interstices occupied by a thermoset resin.

3. Article comprising a deep-drawn unbonded non-woven needle-punched batt consisting essentially of synthetic organic filamentary material and thermosetting resin occupying the interstices of the batt.

4. Article comprising an unbonded non-woven needle-punched batt consisting essentially of synthetic organic filamentary material and a thermosetting resin occupying the interstices of the batt, the ratio of breaking strength to breaking elongation of the batt being less than about 1.

References Cited in the file of this patent

UNITED STATES PATENTS

| | | |
|---|---|---|
| 2,437,689 | Francis | Mar. 16, 1948 |
| 2,730,478 | Morgan | Jan. 10, 1956 |
| 2,764,506 | Picard | Sept. 25, 1956 |
| 2,820,721 | Hitchcock et al. | Jan. 21, 1958 |
| 2,823,142 | Sumner et al. | Feb. 11, 1958 |